Patented Oct. 27, 1953

2,656,571

UNITED STATES PATENT OFFICE 2,656,571

PROCESS OF PRODUCING AMYLOSE FILMS

Howard A. Davis, Ivan A. Wolff, and James E. Cluskey, Peoria, Ill., assignors to the United States of America as represented by the Secretary of Agriculture No Drawing. Application November 22, 1949, Serial No. 128,901

4 Claims. (Cl. 18—57)

(Granted under Title 35, U. S. Code (1952), sec. 266)

This application is made under the act of March 3, 1883, as amended by the act of April 30, 1928, and the invention herein described, if patented in any country may be manufactured and used by or for the Government of the United States of America for governmental purposes throughout the world without the payment to us of any royalty thereon.

This invention relates to novel starch films and particularly amylaceous films consisting substantially of, or at least predominating in, the linear type or fraction of starch known as amylose or "A" fraction.

This invention has among its objects the production of self-supporting films from amylose, articles coated with amylose films, and a novel process for preparing such films by forming from an aqueous solution. A further object is the provision of a method for drying amylose films whereby improved products are obtained.

Satisfactory films have been cast from solutions of amylose acetate, and it is commonly known in the art that self-supporting films can be prepared from linear polymeric materials of sufficiently high molecular weight or degree of polymerization. Nevertheless, although amylose itself possesses many of the physico-chemical properties which characterize satisfactory film-forming substances, only fragmentary or rudimentary films predominantly of amylose have been prepared prior to this invention.

We have discovered that transparent, strong, and pliable amylose films may be prepared according to the process of the invention as hereinafter described. These films have a plurality of advantageous characteristics which makes them particularly suitable as packaging materials, for protective coatings, or for purposes in which a film, digestible or absorbable by body fluids, is desired and are, moreover, useful for general purposes in which self-supporting films are employed.

The term "amylose" as used in this specification and in the appended claims is intended to include any substantially linear amylaceous polysaccharide composed of anhydroglucose units joined predominantly by alpha 1,4-glucosidic linkages. Thus the term includes the amylose which can be separated from the common starches by well-known methods, such as the Meyer hot water extraction procedure, or the alcohol precipitation procedure of Schoch.

The film-forming properties of amylose, in accordance with the processes of this invention, are not seriously affected by the presence of up to 50 percent of amylopectin, the branch chain constituent of starch. The invention therefore includes the preparation of starch films which may contain up to 50 percent amylopectin, the balance being amylose. It also includes those naturally occurring starches which consist predominantly of amylaceous linear polymeric glucosides, as for example, the starch obtained from wrinkled seeded peas. Films containing larger proportions of amylopectin within the specified range are slightly more sensitive to atmospheric humidity changes, but otherwise possess the same general physical properties as films consisting substantially of amylose.

The proportion of amylose in our films should be at least 50 percent or more. The balance may consist of amylopectin as previously mentioned. Moreover, fillers, dyes, modifiers, such as plasticizers, water-repelling or water-proofing agents, and the like may be included.

The solubility of amylose differs considerably from the solubility of the known amylose esters or other derivatives, amylose being a strongly hydrogen-bonded hydroxylic material and therefore of considerably limited solubility in the usual solvents. Amylose can be dissolved in certain organic solvents, such as formamide, ethylene diamine, or aqueous formaldehyde or glyoxal. Moreover, solutions of amylose in aqueous inorganic media have been made. Nevertheless, prior to this invention, satisfactory films have not been formed from these solutions.

We have discovered that amylose solutions may be prepared in an aqueous medium from which good quality films may be formed, if the aqueous medium is approximately saturated with a chemical compound known to form molecular complexes with the amylose. Examples of these complexing compounds are certain low-molecular weight aliphatic alcohols, such as butanol or pentanol, diethyl Cellosolve, and organic bases such as pyridine, or other such agencies as disclosed, for example, by Whistler and Hilbert. J. A. C. S. 67, 1161 (1943). For the purpose of this invention we employ those amylose complexing agents having appreciable solubility in water. Starch has been fractionated by suspending it in an aqueous medium in the presence of a wide variety of chemical agents known as complexing agents. The suspension is then heated, and after the solution is complete, it is cooled slowly, whereupon the amylose precipitates in the form of a complex with the complexing agent.

In preparing our amylose film-forming solutions, we prefer to wet the amylose with the complexing compound, adding the wet powder or slurry to hot water, with vigorous agitation. The solutions may also be prepared by saturating the water with the complexing compound and then adding the powdered amylose. After the mixture has been effected, complete solution is then brought about, for example, by stirring the mixture at elevated temperature. The specific manner in which the solution is finally obtained is not critical, and many methods for doing so will occur to those skilled in the art. For the best appearing and most satisfactory films it is important to obtain a good clear solution. Autoclaving in steam at 15 pounds per square inch gage pressure for a short period usually improves the transparency of the solution.

Formation of our amylose films may be accomplished from the solutions, for example, by casting or spraying the solution upon a smooth surface. The casting may be carried out either batch-wise or by known methods for producing continuously cast films. For example, the film may be cast upon a continuously rotating drum or upon a moving belt. The casting surface may be of polished metal, plastic, or mesh treated to prevent penetration of the casting solution. In either event provision may be made for maintaining the temperature and other drying conditions within the limits subsequently described for films of improved appearance. Moreover, the solution may be sprayed upon the forming surface, instead of being cast.

In addition to the above methods of forming one may also produce our amylose films by dip coating. This method together with spraying possesses the advantage over casting, of permitting the formation of films of curved or irregular shape, and includes the formation of the film directly upon the object which is to be covered by the film. In this connection we contemplate the dip coating or spraying of metal objects such as electrodes used in dry batteries, articles of food, textiles, and the like.

If films are not formed immediately, the solution must be kept warm enough to avoid gelling and/or retrograding. The temperature at which gelling or retrograding will occur, naturally varies with the type of amylose and varies likewise with the concentration and with the particular complexing compound employed. For example, an aqueous solution containing 3 percent corn amylose and 8-10 percent butanol should be kept above 40° C. It is convenient in practice to keep the solutions slightly below the boiling point, and covered to minimize evaporation. In the case of butanol as the complexing compound, the solutions should be kept below 92° C., the boiling point of the butanol-water azeotrope.

Satisfactory films may be prepared from solutions ranging from 2 percent by weight of amylose and higher, the upper concentration limit being governed by the complexing agent and the particular type of amylose employed, i. e., by the ability of the amylose to remain in solution. In general, the upper limit is approximately 15 to 30 percent amylose by weight.

The warm amylose solution may be cast onto a smooth surface. A doctor blade set at the desired clearance is next passed over the cast solution, and the moist film is then dried. Amylose films cast on cleaned glass tend to adhere when dry; however, they may be readily removed if cast on a chrome-plated surface. Other smooth surfaces not attacked by the solvent, such as polished stainless steel, plastic, and the like are also suitable.

We have discovered that the manner of drying affects the appearance and, to some extent the physical properties, particularly the strength, of the resulting films. This effect takes place irrespective of the particular manner in which the films are formed. We have found that films of very good physical properties can be formed by drying the cool film, i. e., at about room temperature. This mode of drying, however, involves early transformation of the solution to a gel, and the dried films are somewhat milky in appearance. On the other hand, if the film of amylose solution is formed, as for example cast, on a heated surface and kept at a temperature sufficient to prevent gelling until the amount of solvent remaining in the film has been reduced to a minimum, the film will have better clarity and luster, and be somewhat stronger than similar films dried at room temperature. This effect of the improvements described may be noted employing film-forming and drying temperatures as low as 40° C., but the improvements are more pronounced at higher temperatures. Care must be taken to avoid drying temperatures which approximate the boiling point of the particular solvent mixture employed. In general, the temperatures of drying, according to our invention, are maintained within the range of 40° C. up to the point of incipient boiling of the solvent mixture. As previously noted the upper limit in the case of the butanol-water is about 92° C. It will vary in the case of other solvent mixtures and with the pressures employed. The temperature should be maintained within these limits at least until the amount of solvent remaining in the film has been reduced to a minimum. Preferably it is maintained until the film is dry.

The rate of evaporation from the drying films also affects the appearance of the film. Unduly rapid drying may result in cracks, warping, and/or concentric drying marks. It is therefore advisable to reduce the drying rate, as for example, by drying the films under conditions of increased relative humidity. This may be accomplished conveniently by carrying out the drying in a substantially enclosed space provided with an opening or openings, thereby reducing the velocity of the surrounding air current and the rate at which solvent vapors are removed from the vicinity of the film.

The amylose films prepared according to this invention may be treated by surface coating in accordance with known processes applied to similar films, such as regenerated cellulose and the like. Moreover, as previously mentioned, additional substances, such as plasticizers, water-repelling or water-proofing agents, dyes, and the like may be incorporated in the film-forming solutions or in the films after casting.

The following examples illustrate the invention.

EXAMPLE 1

A 250 ml. beaker containing 150 ml. of water was heated in the steam bath. When the water reached about 90° C. a slurry of 9.0 g. of amylose in 37.5 ml. of n-butanol was poured into the vigorously stirred water, and stirring and heating were continued for 12 minutes. The beaker was covered with a watch glass and placed in an autoclave in steam at about 15 pounds per square inch gage (about 120° C.) for 22 min., after which the hot solution was filtered through a hot fritted-glass funnel with very light suction. The filter flask, loosely stoppered to minimize evaporation from the filtered amylose solution, was placed in the steam bath, and the steam supply was adjusted so that there was some refluxing of butanol-water azeotrope on the inner walls of the flask.

Twenty ml. aliquots of the clear amylose solution were poured onto heavily chrome-plated brass plates and drawn down with a 6-in. wide casting blade set for 0.015 in. clearance. Plates and blade were held at 54°-60° C. during casting and the freshly cast films dried at temperature of 48°-60° C. under an initially large but gradually decreasing relative humidity for 4 hours. After gradual cooling to room temperature there were obtained smooth, flexible, transparent films, about 0.015 to 0.050 mm. in thickness, with tensile strengths of the order of 8 kg./mm.$^2$ and 10-15 percent elongation at break.

EXAMPLE 2

A solution was prepared by mixing 8.0 g. of corn amylose with 12.4 ml. of n-butanol and adding the mixture to 82 ml. of well-stirred hot (90° C.) water. After stirring and heating (in the steam bath) for 10 min. the solution was fairly clear and 20 ml. aliquots were cast on chrome-plated brass plates heated to from 60° to 80° C. over an electric hot plate. The casting blade clearance was 0.020 inch. After casting, the chrome pates were removed from the hot plate, allowing the film to cool to room temperature in about an hour. The films produced were flexible, smooth, and transparent; about 0.02 to 0.03 mm. thick and with tensile strengths of about 6.3 kg./mm.$^2$

EXAMPLE 3

A film was cast essentially as in Example 2 but the temperature of the plate was maintained at approximately 50° C. until the film was completely dry. This film had a tensile strength of approximately 7 kg./mm.$^2$ Instead of butanol as employed in the foregoing examples, we may likewise use pentanol as the complexing compound.

EXAMPLE 4

Approximately one gram of corn amylose, dispersed in 10 ml. of pyridine, was diluted to 50 ml. with water and heated, with vigorous stirring, to 80° C. All but a few flakes of amylose soon dissolved and the solution was cast on a hot (90-95° C.) chrome plate. When the edges of the film began to separate from the plate it was transferred to an oven at 60° C. to complete the drying process. The product was a film which was transparent and flexible, having a tensile strength of 5.5 kg./mm.$^2$

EXAMPLE 5

Amylose (1.1 g.) was moistened with 2 ml. of diethyl Cellosolve and then dispersed in 47.5 ml. of water, stirring vigorously and heating to 95° C. to get maximum solution of the amylose. After 15 min. the stirrer was stopped and undissolved amylose was let settle out before decanting the nearly clear supernatant liquid onto a warm (50° C.) chrome plate and smoothing it with a casting blade set for 0.040 inch clearance. An hour later the heat was turned off, allowing the plate to cool slowly overnight. Easily separated from the plate, the resulting amylose film was flexible and transparent, having a tensile strength of 6.5 kg./mm.$^2$

EXAMPLE 6

Ten grams of corn amylose (containing 91 percent of linear fraction by potentiometric iodine titration) was dissolved in 100 ml. water and 25 ml. n-butanol by stirring for 10 minutes at 100° C. The solution was then autoclaved for 20 minutes at 15 pounds steam per square inch gage. Strips of zinc sheet approximately 1″ x 5″ x 0.020″ were coated with this hot solution by dipping, and were then hung up to dry. The zinc sheet was covered with a uniform adherent coating of amylose film over that area where it had been wetted by the amylose solution.

Amylose films made in accordance with Examples 1-3 above were tested to determine their folding endurance. The tests were made at 21° C. and at 65 percent relative humidity. Films averaging 0.04 mm. in thickness withstand from 200 to 500 Schopper double folds and individual values as high as 1450 Schopper double folds have been obtained.

The amylose employed in the foregoing examples was 90 percent pure, the remainder comprising amylopectin. Films were cast from mixtures containing increased amounts of amylopectin by procedure similar to that described in the foregoing examples. The cast films, particularly those containing half amylose and half amylopectin, were hazier, compared with the films of the above examples. The following table contains tensile strength and elongation values for a series of films containing varying proportions of amylopectin made in accordance with this invention.

Table

| Film | Percentage of— | | Tensile Strength, kg./mm.$^2$ | Elongation, percent |
|---|---|---|---|---|
| | Amylose | Amylopectin | | |
| 1 | 75 | 25 | 5.9 | 16-36 |
| 2 | 75 | 25 | 6.3 | 12-27 |
| 3 | 60 | 40 | 5.8 | 10-30 |
| 4 | 60 | 40 | 5.8 | 15-25 |
| 5 | 50 | 50 | 5.2 | 12-24 |
| 6 | 50 | 50 | 5.6 | 8-18 |

We claim:

1. The method of forming amylose-containing films comprising dissolving an amylaceous substance comprising at least 50 percent amylose in an aqueous solution containing a saturating amount of an amylose complexing agent selected from the group consisting of butanol and pentanol in proportions to form a 2 to 30 percent amylose solution, maintaining the solution above its gelation temperature, casting the solution upon a surface to form an aqueous film and removing said complexing agent while maintaining the temperature of said film above its gelation temperature.

2. The method of claim 1 in which the complexing agent is n-butanol.

3. The method of claim 1 in which the complexing agent is pentanol.

4. The method of claim 1 in which the amylaceous substance comprises 90 percent amylose.

HOWARD A. DAVIS.
IVAN A. WOLFF.
JAMES E. CLUSKEY.

References Cited in the file of this patent

UNITED STATES PATENTS

| Number | Name | Date |
|---|---|---|
| 2,012,344 | Levey | Aug. 27, 1935 |
| 2,027,682 | Eichmann et al. | Jan. 14, 1936 |
| 2,137,168 | Levey | Nov. 15, 1938 |

OTHER REFERENCES

Kerr et al.: "Cereal Chem.," 19 pp. 64-81 (73, 74, 75, 78 and 79). 1942.

Kerr: "Chemistry and Industry of Starch," 1944, pp. 118, 121, 150 and 151.

Kerr: "Chemistry and Industry of Starch," 2nd ed., pp. 190, 191. 1950.